UNITED STATES PATENT OFFICE.

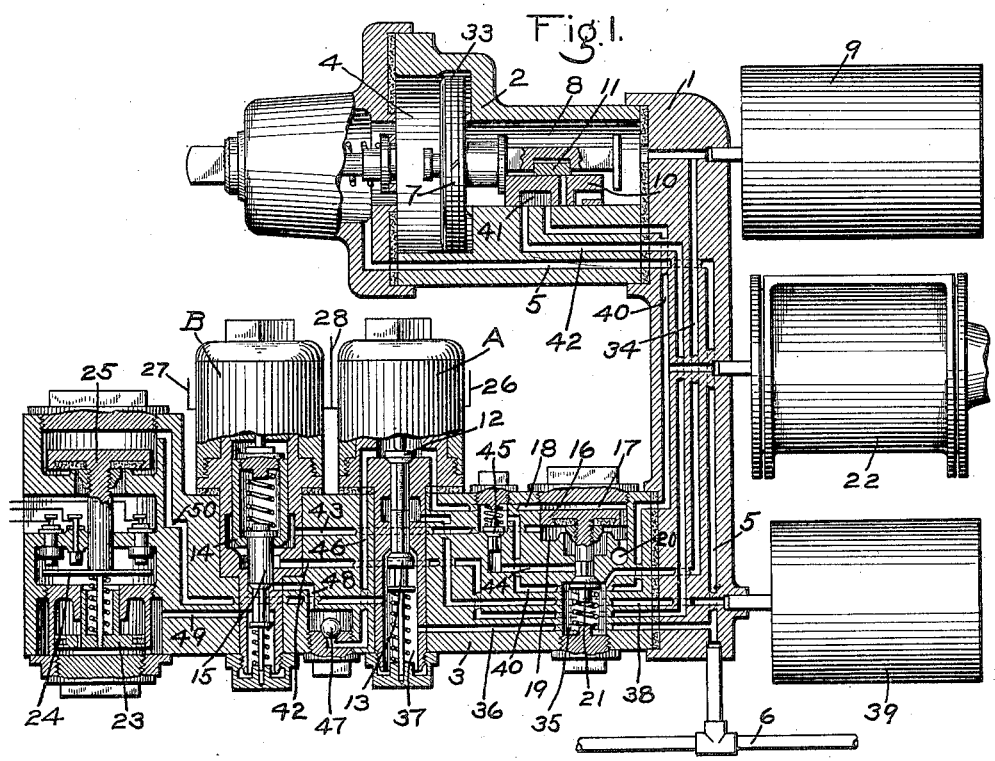

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,400,639.        Specification of Letters Patent.        Patented Dec. 20, 1921.

Application filed January 14, 1921. Serial No. 437,130.

*To all whom it may concern:*

Be it known that I, THOMAS H. THOMAS, a citizen of the United States, residing at Edgewood, in the county of Allegheny and State of Pennsylvania, have invented new and useful Improvements in Electropneumatic Brakes, of which the following is a specification.

This invention relates to electro-pneumatic brakes of the type employed for controlling the brakes on cars of a train.

One object of my invention is to provide an electro-pneumatic brake equipment having means for preventing the loss of braking force in case of failure of current or the breaking of train wires.

Another object of my invention is to provide improved means for causing an application of the brakes upon failure of current or breakage of train wires.

Other objects and advantages will appear in the following more detailed description of the invention.

In the accompanying drawing; Figure 1 is an elevational view of an electro-pneumatic car brake equipment, embodying my invention, with electro-pneumatic control valve mechanism shown in section; Fig. 2 a wiring diagram of the circuits for a locomotive and two cars; and Figs. 3, 4, and 5, views of the electric brake drum in the respective positions of lap, service, and emergency.

As shown in Fig. 1 of the drawing, the electro-pneumatic car equipment may comprise a bracket section 1 to which is applied a triple valve portion 2 and an electro-pneumatic portion 3.

The triple valve portion 2 may comprise a casing having a piston chamber 4 connected by passage 5 to brake pipe 6 and containing piston 7 and having a valve chamber 8, connected to auxiliary reservoir 9 and containing the usual main slide valve 10 and graduating valve 11 adapted to be operated by piston 7.

The electro-pneumatic portion 3 comprises electromagnets A and B, the magnet A controlling double beat valves 12 and 13 and the magnet B valves 14 and 15. Also included in the portion 3 is a piston 16 having the chamber 17 at one side connected by passage 18 to valve 12 and chamber 19 at the opposite side open to an atmospheric exhaust port 20, and said piston is adapted to operate a valve 21 for controlling the supply of fluid from the auxiliary reservoir 9 to the brake cylinder 22.

For effecting an emergency application of the brakes, a piston 23 is provided, which is adapted to operate a switch member 24 and also a valve 25 for venting fluid from the brake pipe 6 to the atmosphere.

The magnet A has one terminal connected to a train wire 26, the magnet B has one terminal connected to a train wire 27 and the other terminal of each magnet is connected to a common return wire 28.

On the locomotive, as shown diagrammatically in Fig. 2 if the drawing, there is provided a source of current, such as an electric generator 29, an overload switch device 30, and an electric brake drum 31, for controlling the circuits of the magnets A and B. The switch device 30 is located in the supply wire 32 leading to a contact controlled by the brake drum and the train wires 26 and 27 also lead to contacts controlled by said drum.

The brake valve (not shown) for controlling the brake pipe pressure may be operatively connected to the brake switch drum 31 and the pneumatic operating positions except running and emergency positions may be separate from the electric operating positions, fluid under pressure, however, being supplied by the brake valve to the brake pipe in the electric operating positions so as to maintain the brake pipe pressure and also the pressure in the auxiliary reservoirs.

In operation, in the electric running position of the combined brake valve and switch, fluid is supplied by the brake valve to the brake pipe 6 and thence flows to the triple valve piston chamber 4, charging the valve chamber 8 and the auxiliary reservoir 9 through the usual feed groove 33.

Fluid is then supplied from the auxiliary reservoir 9 through passage 34 to valve chamber 35, and since in running position, as shown in Fig. 2, the train wire 26 is connected through the switch drum 31 with the supply wire 32, the magnet A will be energized so as to close the valve 12 and open the valve 13.

Fluid under pressure is therefore supplied from the brake pipe 6, through passage 36 to valve chamber 37 and thence past the valve 13 to passage 38 and reservoir 39, thus charging the reservoir 39 to the pressure carried in the brake pipe.

The magnet B being deënergized in running position, the brake cylinder 22 is connected to the exhaust, through passage 40, cavity 41 in triple slide valve 10, passage 42, past the valve 14 to passage 43, and through chamber 19 to exhaust port 20.

If it is desired to effect an electric service application of the brakes, the brake drum 31 is turned to service position, as shown in Fig. 4, in which the train wire 27 is connected to the supply wire 32, so that the magnet B is energized. The valves 14 and 15 are then moved to the closed position by the magnet B, the valve 14 cutting off communication through which fluid is released from the brake cylinder.

The magnet A being deënergized in this position, the valve 13 will be closed, cutting off communication from the brake pipe to the reservoir 39 and the valve 12 will be opened so that fluid is supplied from the reservoir 39, through passage 38 to passage 18 and chamber 17.

The piston 16 is then operated to cut off communication from passage 43 to exhaust port 20 and also to open valve 21.

Fluid under pressure is then supplied from the auxiliary reservoir 9 through passage 34, past valve 21 to passage 44, and thence past check valve 45 to passage 40 and the brake cylinder 22.

The brakes may be released after an application of the brakes by moving the brake switch to running position, in which the magnet A is energized and the magnet B deënergized. Fluid under pressure is then released from the brake cylinder through passage 40, cavity 41 in slide valve 10, passage 42, past the release valve 14 to passage 43 and thence to exhaust port 20.

An emergency application of the brakes is effected by moving the brake switch to emergency position, which is also the pneumatic emergency position of the brake valve, and in which all the circuits are opened, as shown in Fig. 5, so that both the magnets A and B are deënergized.

The magnet A being deënergized, fluid is supplied to piston chamber 17 to operate the piston 16 and valve 21 as in a service application, but since the magnet B is also deënergized, fluid is now supplied to piston 23 when the valve 12 is opened, through passage 46, past check valve 47, to passage 48, and thence past the open valve 15 to passage 49 and the chamber below piston 23.

The piston 23 is then operated to close the switch 24 and also open the vent valve 25. Fluid is then vented from the brake pipe on each car of the train through the passages 36 and 50, so as to quickly reduce the brake pipe pressure on each car simultaneously in addition to the venting of fluid from the brake pipe by operation of the brake valve and the prompt movement of each triple piston 7 to emergency position is therefore effected, so that fluid is supplied from the auxiliary reservoir 9 to the brake cylinder, in the usual manner.

The closing of switch 24 is not necessary so far as an emergency application initiated by the movement of the brake switch and the brake valve is concerned, since the magnet circuits are opened by the movement of the brake switch itself.

If, however, in making a service application of the brakes, the circuit wire to any one or more of the magnets B should be broken or should break during the service application or should one or more magnets B fail to operate, then since the valve 15 will remain in or move to its open position, by reason of the deënergization of magnet B, the opening of valve 12 by the deënergization of magnet A will operate to admit fluid to piston 23, so as to move the piston 23 and close the switch 24.

The line circuits being then short circuited, any circuit which is closed by the position of the brake switch, such as the circuit of the magnet B in the service position, will operate to supply a rush of current from the source 29 to the overload switch device 30, so that the switch will be operated to open the circuit in the usual manner.

All of the magnets B in the train will then be deënergized, so that the pistons 23 will be operated simultaneously throughout the train to open the vent valves 25 and vent fluid from the brake pipe so as to effect the quick movement of the triple valve pistons to emergency position and the production of an emergency application of the brakes.

If while running, with the parts in normal release position, as shown in Fig. 1, the circuit wire of one or more magnets A should break or should one or more magnets A fail for any reason, then both magnets being deënergized on a particular car, the piston 23 on that car will be operated to close the switch 24 and thus cause the opening of the overload switch 30, so that as before described, an emergency application of the brakes is effected throughout the train.

Having now described my invention, what I claim as new and desire to secure by Letters Patent, is:—

1. In an electro-pneumatic brake, the combination with a brake cylinder and auxiliary reservoir, of a piston device for controlling the exhaust from the brake cylinder and the supply of fluid from the auxiliary reservoir to the brake cylinder and a magnet operated valve for supplying fluid to said piston device for operating same.

2. In an electro-pneumatic brake, the combination with a brake cylinder, and auxiliary reservoir, of a storage reservoir, a piston device for controlling the supply of fluid from the auxiliary reservoir to the brake cylinder and magnet controller valve means for supplying fluid from the storage reservoir to said piston device.

3. In an electro-pneumatic brake, the combination with a brake pipe, brake cylinder, and auxiliary reservoir, of a storage reservoir, a piston device for controlling the supply of fluid from the auxiliary reservoir to the brake cylinder, and magnet controlled means having one position for supplying fluid from the brake pipe to the storage reservoir and another position in which fluid is supplied from the storage reservoir to said piston device.

4. In an electro-pneumatic brake, the combination with a brake cylinder and brake pipe, of a reservoir normally charged with fluid under pressure, a piston device for controlling the supply of fluid to the brake cylinder, magnet controlled means for supplying fluid from said reservoir to said piston device for operating same, a quick action valve device operated by fluid supplied to said piston device by venting fluid from the brake pipe, and a magnet controlled valve for controlling communication through which fluid is supplied to the quick action valve device.

5. In an electro-pneumatic brake, the combination with a brake cylinder and brake pipe, of an emergency reservoir, a piston device for controlling the supply of fluid to the brake cylinder, a service magnet, means controlled by said magnet for supplying fluid from the brake pipe to the emergency reservoir and from the reservoir to said piston device, a piston operated by fluid supplied to said piston device for effecting an emergency application of the brakes, a release magnet, and means controlled by said magnet for controlling the release of fluid from the brake cylinder and the supply of fluid to said piston.

6. In an electro-pneumatic brake, the combination with a brake cylinder, of an emergency reservoir, a service application piston for controlling an exhaust port to the brake cylinder, a valve operated by said piston for supplying fluid to the brake cylinder, a service magnet, means operated by said magnet for supplying fluid from said reservoir to operate said piston, an emergency piston operated by fluid supplied to said service application piston, a release magnet, and means operated by said magnet for controlling communication from the brake cylinder to said exhaust port and communication through which fluid is supplied to said emergency piston.

In testimony whereof I have hereunto set my hand.

THOMAS H. THOMAS.